April 29, 1969     W. C. BROWNING     3,441,504

DRILLING MUD ADDITIVE FOR FILTRATION CONTROL

Original Filed Jan. 24, 1964 pH VALUES OF CAUSTICIZED LIGNITE AND ORGANIC ZINC COMPLEX

RHEOGRAMS OF SOLUTIONS CONTAINING 25% by wt. ADDITIVES AT 75°F
(SOLUTIONS HOT-ROLLED)

INVENTOR:
WILLIAM C. BROWNING,
BY Kingsland, Rogers, Ezell & Robbins
ATTORNEYS

United States Patent Office 3,441,504
Patented Apr. 29, 1969

3,441,504
**DRILLING MUD ADDITIVE FOR
FILTRATION CONTROL**
William C. Browning, Houston, Tex., assignor to Milchem Incorporated, Houston, Tex., a corporation of Delaware
Continuation of application Ser. No. 339,950, Jan. 24, 1964. This application Mar. 14, 1968, Ser. No. 715,473
Int. Cl. C09k 3/00
U.S. Cl. 252—8.5     3 Claims

ABSTRACT OF THE DISCLOSURE

Drilling mud additives for filtration control comprising a colloidally dispersible zinc complex of a lignite having an oxygen content in excess of about 20%.

CROSS-REFERENCE TO RELATED APPLICATIONS

This application is a continuation of application No. 339,950, filed Jan. 24, 1964, now abandoned.

BACKGROUND OF THE INVENTION

Field of the invention.—This invention relates to improvements in drilling mud additives and processes for preparing the same, and, in particular, is concerned with a colloidally dispersible heavy metal complexed special lignite composition for use in low pH muds for improved filtration control.

Description of the prior art.—In the art of drilling wells, water base muds, including fresh water, brackish and salt muds are circulated to provide back pressure on penetrated formations to prevent blow-outs and to carry the cuttings from the drill bit to the surface of the earth. Among the problems encountered in providing a suitable mud composition is the need for filtration control to prevent excessive loss of fluid from the mud into the strata penetrated by the well bore.

Various additives have been provided to improve filtration control of drilling muds. Starch has been used but it is unstable at high temperatures and is subject to bacterial action. Carboxyl methyl cellulose provides heat stability but is susceptable to salting out by electrolytes. In some measure the use of lignosulfonates as a thinner or deflocculant provides incidental filtration control. However, none of the prior art mud additives for filtration control have been fully satisfactory, particularly under adverse conditions of high bottom-hole temperatures and electrolyte contamination.

SUMMARY OF THE INVENTION

By means of this invention there has been provided a composition for use with drilling muds which has physical chemical characteristics designed to augment and improve filtration control. The product of this invention may be used in fresh water, brackish, or salt muds. The composition can be used at relatively low pH, i.e., low alkalinities below that required by conventional filtration control additives. Furthermore, the composition has improved characteristics at high temperatures and high pressure conditions.

The composition is basically an organic complex of a soluble heavy metal, such as zinc, wherein the organic portion is obtained from a special lignite material such as leonardite. The leonardite is characterized by a large number of carboxylic acid groups and has improved solubility in alkali over conventional lignites having lesser carboxylic acid groups.

Further, through this invention, the drilling mud additive can be added to a low pH mud without increasing the alkalinity of the mud and consequent undesirable formation clay reaction resulting in clay cleavage, which is conventionally encountered with causticized soluble lignites heretofore employed. The organic zinc complex composition of this invention is compatible with and can be used to augment the desirable characteristics of the various polyelectrolyte compositions, such as lignosulfonates and bark extracts, used as drilling mud additives. The composition has improved solubility characteristics and is fast acting and less susceptible to salting out effects in the presence of electrolytes which makes it more effective as a filtration control agent and emulsifier under most adverse conditions. It is effective in fresh water, brackish, or salt muds.

Essentially, the composition can be simply prepared by dissolving leonardite or other lignite having an oxygen content in excess of about 20% in a caustic solution comprised of potassium hydroxide and sodium hydroxide followed by the addition of zinc sulphate. The resultant composition upon drying to a dried product can be simply employed in the field by relatively unskilled workers with a high degree of success.

The above features are objects of this invention and further objects will appear in the detailed description which follows and will otherwise be apparent to those skilled in the art.

BRIEF DESCRIPTION OF THE DRAWINGS

For the purpose of example, there are shown in the accompanying drawings, characteristics of properties of the organic zinc complex as compared to causticized lignite.

In the drawings.

DESCRIPTION OF PREFERRED EMBODIMENTS

Figure 1:
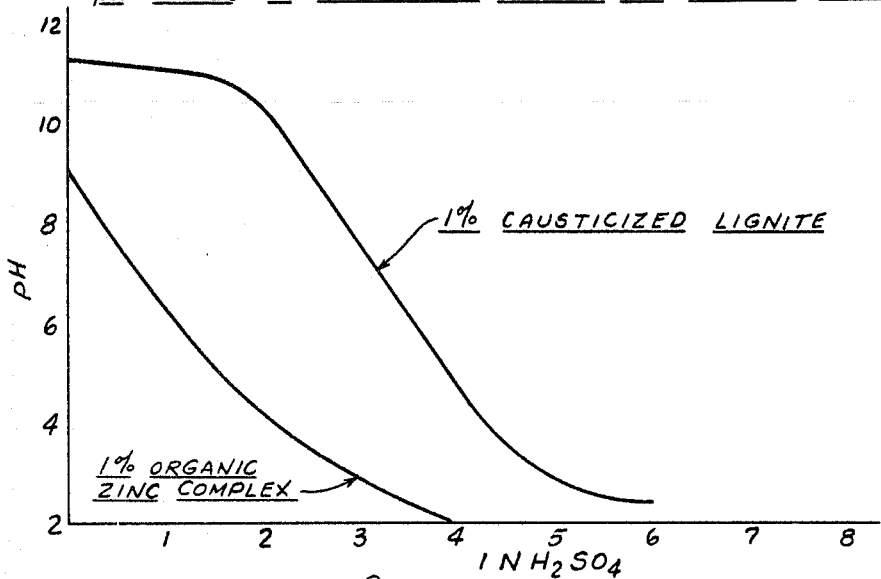
FIGURE 1 is a curve showing the pH value of causticized lignite and the organic zinc complex upon the addition of sulphuric acid.

The organic part of the organic zinc complex of this invention is derived from a special type of lignite or lignite by-product, such as leonardite which is characterized by its high oxygen content and increased alkali solubility. Leonardite is a soft, earthy, medium brown, coal-like substance associated with lignitic outcrops in North Dakota and is mined commercially. Normal lignite may be converted to a material of similar properties by oxidation and such converted lignite may be used in the preparation of the composition of this invention. Leonardite has an oxygen content higher than that of other types of lignite and in the order of 28% to 29% oxygen as compared to 19% to 20% oxygen in lignite. The higher oxygen content of leonardite is due to the larger number of carboxylic acid groups which may explain the great increase in alkali solubility of leonardite as compared to lignite. Infrared studies indicate that the material is mixed salts of humic acids.

There are three types of leonardite. Type one is a black colloidal material that swells to several times its original volume in water and dissolves in alkali hydroxides leaving almost no residue. It is analogous to what has been described as native humus acid and gives dark brown rich colored solutions of alkali, and may be precipitated as a light brown colloid with acids at a pH of four or lower. Type two is a mixture of type one leonardite and lignites. Type two is found wherever a lignite seam is overlaid with less than eight feet of water permeable sandy sediment. Type three leonardite resembles the laboratory precipitated product from type one and is a fine grained colloidal material and is intimately intergrown with gypsum. All three types may be used in this invention.

The solubility of lignitic materials is easily determined by preparing a stock of two and one-half percent caustic soda solution. Ten grams of the dried and powdered lignitic material are contacted with enough two and one-half percent caustic solution to bring the volume of the sample to 100 cc. The sample is thoroughly mixed by mechanical action. The mixture is then centrifuged for five minutes at 1500 r.p.m., after which the liquid portion is decanted. The residue or the material at the bottom of the centrifuge tube is again contacted with two and one-half percent caustic soda solution to return the volume to 100 cc. This is again followed by agitation, centrifugation, and decantation. The entire procedure is then repeated a third time and following the third washing the residue is dried, weighed, and the percent insolubles is then calculated.

The solubility of leonardite is greater than that of conventional lignite. As an example, a typical solubility of conventional lignite is 66⅔% in alkali, whereas leonardite has a solubility of about 85%. All proportions herein are by weight. A typical leonardite having 85% solubility consists of 13.5% moisture, 71.5% humic acids, and 15% residue, whereas lignite of 66⅔% solubility may have an analysis of 15% moisture, 51.7% humic acid, and 33.3% residue.

The preparation of the organic zinc complex of this invention is essentially accomplished by solubilizing leonardite in a caustic solution and adding zinc sulfate, while keeping the solution hot to facilitate reaction. The resultant thickened solution is then dried to a dry end product. The preparation is best shown in the accompanying Example 1 below giving the product composition on an anhydrous basis for 100 lbs.

Example 1

| | Lbs. |
|---|---|
| KOH | 6.6 |
| NaOH | 6.6 |
| Leonardite | 82.7 |
| $ZnSO_4 \cdot 7H_2O$ | 4.1 |
| | 100.0 |

In this example leonardite is solubilized in the caustic solution. A zinc sulfate solution is then added after the leonardite has had sufficient time to solubilize in the caustic soda. Before the addition of the zinc sulfate, the caustic and leonardite solution is brought up and maintained at a temperature of between 150 to 180° F. to keep it at a fluid state. Otherwise, thickening will occur upon the addition of the zinc sulfate. After the mixture of the zinc sulfate has been effected, the product may then be successfully dried at temperatures of about 250 to 325° F. to a powdered product containing approximately 7% moisture. The zinc organic complex thus prepared is then ready for use as a drilling mud additive.

Although the product in Example 1 is a preferred example, it will be understood that the proportion of the various components may be varied somewhat. The ratio of zinc sulfate to leonardite may vary within the range of 0.02 to 0.13 part by weight of zinc sulfate to one part of leonardite. Further, the amount of relative proportions of the sodium hydroxide and potassium hydroxide may be varied within wide limits above the amount required to solubilize the leonardite. It is presently preferred that only a slight excess of caustic be used to avoid alkalinity in the additive of this invention. As an example, the presently preferred ranges may be about, on a wight basis, 5–7.5% sodium hydroxide, 5–7.5% potassium hydroxide, 75.2–88.15% leonardite, and 1.85–9.8% zinc sulfate.

A particular advantage of the organic zinc complex is its low alkalinity when compared to causticized lignites. The titration curve shown in FIGURE 1 illustrates the alkalinity differences between the organic zinc complex and a typical presolubilized causticized lignite. In FIGURE 1 the high initial pH and resistance to pH change of the causticized lignite is to be compared with a relatively lower initial pH and rapid pH change of the organic zinc complex. Causticized soluble lignites cannot be added to a low pH mud such as one with low alkalinity without increasing the alkalinity of the mud with the consequence of increasing undesirable clay reactions and resultant clay cleavage and bore hole fill up.

In contrast the organic zinc complex of this invention can be added to any mud in any required concentration for effective filtration control without effecting undesirable clay reactions. The effective filtration controlling amount of the organic zinc complex required for any particular mud can readily be determined by conventional mud filtration tests. It will, of course, vary for different mud compositions.

Figure 2:
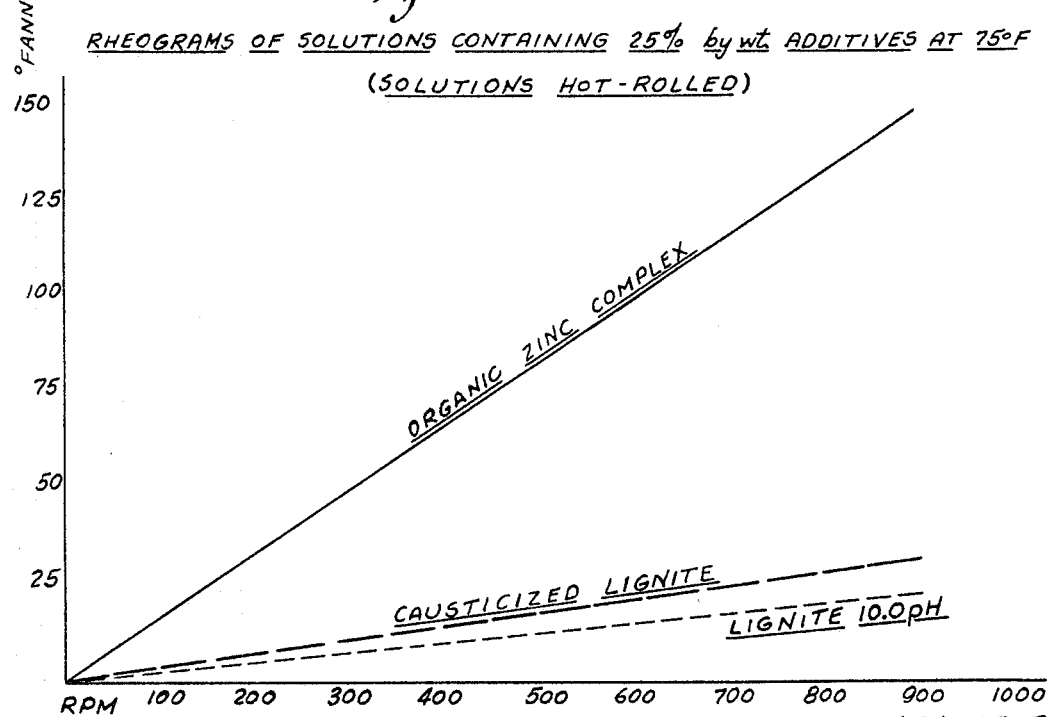
FIGURE 2 is a rheogram of solutions containing 25% by weight of the organic zinc complex, causticized lignite, and lignite.

The unique basic polymeric structure of the organic zinc complex can be shown by comparing the rheograms of 25% by weight organic solutions of the organic zinc complex, causticized lignite, and lignite. The higher viscosities of the organic zinc complex solution in the graph of FIGURE 2 indicates the higher molecular weight of the organic zinc complex polymer over that of a causticized lignite.

The organic zinc complex further has improved solubility and dispersibility characteristics over chrome treated lignites, which renders the organic zinc complex faster acting and less susceptible to salting out effects in the presence of electrolytes. These properties make the organic zinc complex more effective as a filtration control agent and emulsifier under the most adverse conditions. The following API filter loss values shown in table below compare the organic zinc complex stabilized diesel oil emulsions with chrome lignite stabilized diesel oil emulsions at two salt concentrations.

TABLE

| | API filtrate (ml.) | |
|---|---|---|
| NaCl (p.p.m.) | Mil Con | Chrome lignite |
| 5,000 | 3.8 | 4.5 |
| 30,000 | 3.2 | 7.5 |

The effectiveness of the organic zinc complex for reducing filtration rate at salt concentrations approximating that of sea water is apparent.

Field tests have confirmed the filtration rate reduction properties of the organic zinc complex under actual use conditions. For example, in one mud in which an organic polyelectrolyte was employed, one and one-half pounds per barrel of the organic zinc complex reduced the API filtrate from 3 to 2 ml. and reduced the high temperature and high pressure filtrate from 9.5 to 7 ml. In another example an organic zinc complex treated mud maintained in its reduced filtration rate even after the mud had been centrifuged several hours. Prior experiences have shown that centrifugation of comparable muds always increased the filtration rate particularly at high temperatures and high pressure conditions such as at 300° F. and 500 p.s.i.

The organic zinc complex has been specially designed to improve filtration properties in muds particularly in hot-hole conditions. The properties of the organic zinc complex also make it desirable for use as an emulsifier and dispersant in low solids systems. It will act as a thinner in a fresh water environment, but in common with other lignitic materials, rapidly becomes ineffective as a mud thinner with increasing calcium or salt contamination. At the present in high weight organic polyelectrolyte muds exposed to the possibility of electrolytic contamination, it is advisable not to exceed the ratio of one part of the organic zinc complex to four parts of the organic polyelectrolyte to avoid impairment of flow properties. The organic zinc complex may be used to improve filtration rate control in organic polyelectrolyte muds in which the calcium ion concentration in the filtrate exceeds 600 p.p.m.

The organic zinc complex can be used alone or in conjunction with an organic polyelectrolyte to condition oil well drilling muds. When used in conjuction with the organic polyelectrolyte it is compatible with it and has added benefits to its qualities as a filtration control agent.

When so used, it significantly improves the control of filtration rate and materially assists in sealing the exposed formations in the bore hole by plugging micro pores and fractures independent of filtration and filter cake formation.

In the formation of the organic zinc complex, the addition of the caustic solution to the leonardite converts the acid leonardite to sodium salts by conversion of the carboxy groups. The subsequent back titration with the zinc sulfate and the resultant solution provides an organic zinc complex that is of colloidal dimensions with a particle size distribution of colloidal dimensions. Further, in the organic zinc complex, no excess caustic is present, as in causticized lignite, so that when large amounts of the organic zinc complex are employed the pH of the mud is not increased.

The organic polyelectrolytes employed can be lignosulfonates known in the oil drilling art under the trademarks Kembreak, Q-Broxin, Uni-Cal, Peltex, etc., or various bark extracts and polyphenolic compositions known as Rayflo, Milflo, Palcotan, etc.

Although in the examples given above, typical weight ranges and percentages both in the composition, preparation, and in its use in a drilling mud have been given, it will be readily understood that these percentages may be varied somewhat in the usual ranges for variation of components developed in the chemical art. Such use of ranges and substitution of equivalents will be readily apparent to those skilled in the art and are within the scope and teaching of this invention as defined by the claims appended hereto.

What I claim is:

1. A process for preparing a zinc lignite composition for use in drilling muds which comprises solubilizing about 75.2 to 88.15 parts by weight of lignite having about 85% solubility and an oxygen content of about 28 to 29% in an aqueous caustic solution consisting essentially of about 5 to 7.5 parts by weight each of sodium hydroxide and potassium hydroxide, maintaining said solution at about 150 to 180° F. and adding about 1.85 to 9.8 parts by weight of zinc sulfate to said solution and drying said resultant composition at about 250 to 325° F.

2. The process of claim 1 in which said lignite is about 82.7 parts by weight, said caustic solution comprises about 6.6 parts by weight each of sodium hydroxide and potassium hydroxide.

3. A drilling mud additive composition prepared by the process of claim 1.

References Cited

UNITED STATES PATENTS

| | | |
|---|---|---|
| 2,605,221 | 7/1952 | Hoeppel. |
| 2,783,201 | 2/1957 | Rahn. |
| 3,034,982 | 5/1962 | Monroe. |
| 3,079,334 | 2/1963 | Clem. |

OTHER REFERENCES

Rogers: Composition and Properties of Oil Well Drilling Fluids, second edition, pub. 1953 by Gulf Pub. Co. of Houston, Tex., pages 310, 323, and 324.

HERBERT B. GUYNN, *Primary Examiner.*

U.S. Cl. X.R.

260—429.9, 515